(12) United States Patent
Sadil et al.

(10) Patent No.: US 8,893,502 B2
(45) Date of Patent: Nov. 25, 2014

(54) AUGMENTOR SPRAY BAR WITH TIP SUPPORT BUSHING

(75) Inventors: Andreas Sadil, Newington, CT (US);
Steven W. Burd, Cheshire, CT (US);
Bessem Jlidi, Rocky Hill, CT (US);
Dennis M. Moura, South Windsor, CT (US); Christopher R. Brdar, Portland, CT (US); Leong Ma, South Glastonbury, CT (US); Fernando K. Grant, South Windsor, CT (US); Jodie L. Herrmann, Rocky Hill, CT (US); Kelly A. Vanston, West Hartford, CT (US); Matthew J. Westergard, Wethersfield, CT (US); George F. Titterton, III, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 495 days.

(21) Appl. No.: 13/273,974

(22) Filed: Oct. 14, 2011

(65) Prior Publication Data
US 2013/0091849 A1 Apr. 18, 2013

(51) Int. Cl.
*F02K 3/10* (2006.01)

(52) U.S. Cl.
CPC .............. *F02K 3/10* (2013.01); *F05D 2250/192* (2013.01)
USPC .............................................. 60/761; 60/765

(58) Field of Classification Search
CPC ................ F23R 3/20; F23R 3/18; F02K 3/10; F02K 3/08; F02K 3/105
USPC ........................... 60/761, 762, 765, 766, 748
See application file for complete search history.

(56) References Cited

U.S. PATENT DOCUMENTS

| | | | | |
|---|---|---|---|---|
| 2,760,339 A * | 8/1956 | Jurisich | ........................... | 60/765 |
| 2,963,857 A * | 12/1960 | Egbert et al. | .................... | 60/765 |
| 3,016,704 A * | 1/1962 | Duncan et al. | .................. | 60/765 |
| 3,793,838 A | 2/1974 | Nash | | |
| 3,800,530 A * | 4/1974 | Nash | .............................. | 60/761 |
| 3,980,233 A * | 9/1976 | Simmons et al. | ............. | 239/400 |
| 4,798,048 A * | 1/1989 | Clements | ........................ | 60/764 |
| 5,297,391 A * | 3/1994 | Roche | ............................. | 60/740 |
| 5,396,761 A * | 3/1995 | Woltmann et al. | ......... | 60/39.827 |
| 6,141,967 A * | 11/2000 | Angel et al. | ..................... | 60/737 |
| 6,301,899 B1 * | 10/2001 | Dean et al. | ...................... | 60/737 |
| 6,415,594 B1 * | 7/2002 | Durbin et al. | ................... | 60/772 |
| 6,418,726 B1 * | 7/2002 | Foust et al. | ..................... | 60/776 |
| 6,438,940 B1 | 8/2002 | Vacek et al. | | |
| 6,755,024 B1 * | 6/2004 | Mao et al. | ........................ | 60/776 |
| 6,895,755 B2 * | 5/2005 | Steinthorsson et al. | ........ | 60/742 |
| 6,959,535 B2 * | 11/2005 | Mancini et al. | ............. | 60/39.094 |
| 6,968,694 B2 | 11/2005 | Buey et al. | | |
| 6,971,239 B2 | 12/2005 | Snyder et al. | | |
| 7,000,403 B2 * | 2/2006 | Henriquez et al. | .............. | 60/776 |

(Continued)

*Primary Examiner* — William H Rodriguez
(74) *Attorney, Agent, or Firm* — O'Shea Getz P.C.

(57) ABSTRACT

An augmentor for a gas turbine engine includes an augmentor spray bar with a spray bar outlet, and an augmentor spray bar tip. The spray bar tip includes a tip body, a tip bushing and a tip support strut. The tip body includes a first flow passage extending therethrough between a tip inlet and a tip outlet, wherein the tip inlet is connected to the spray bar outlet. The tip bushing includes a bushing bore. The tip body extends through the bushing bore defining a second flow passage between the tip body and the tip bushing. The tip support strut connects the tip body to the tip bushing across the second flow passage.

14 Claims, 3 Drawing Sheets

(56) References Cited

U.S. PATENT DOCUMENTS

| | | |
|---|---|---|
| 7,013,635 B2 | 3/2006 | Cohen et al. |
| 7,467,518 B1 * | 12/2008 | Vermeersch ............... 60/776 |
| 7,475,546 B2 * | 1/2009 | Snyder et al. ............... 60/761 |
| 7,506,510 B2 * | 3/2009 | Thomson ............... 60/740 |
| 7,506,514 B2 | 3/2009 | Muldoon et al. |
| 7,578,131 B2 | 8/2009 | Muldoon et al. |
| 7,647,775 B2 * | 1/2010 | Muldoon et al. ............... 60/761 |
| 7,712,315 B2 | 5/2010 | Hautman et al. |
| 7,779,636 B2 * | 8/2010 | Buelow et al. ............... 60/742 |
| 2006/0292504 A1 * | 12/2006 | Baboeuf et al. ............... 431/5 |

* cited by examiner

AUGMENTOR SPRAY BAR WITH TIP SUPPORT BUSHING

This invention was made with government support under Contract No. F33657-99-D-2051 awarded by the United States Air Force. The government may have certain rights in the invention.

BACKGROUND OF THE INVENTION

1. Technical Field

This disclosure relates generally to an augmentor for a gas turbine engine and, more particularly, to an augmentor spray bar with a tip support bushing.

2. Background Information

Various augmentor (or afterburner) configurations for a gas turbine engine are known in the art. One type of augmentor configuration includes a spray bar connected between a base and a spray bar tip. The base is connected to an outer augmentor duct case, and extends radially inwards into a trailing edge box of an augmentor vane. The spray bar is arranged within the trailing edge box. The spray bar tip extends from the trailing edge box through a tip aperture in a trailing edge box endwall. An air gap separates a wall of the tip aperture and the spray bar tip. In such a configuration, the spray bar tip is not connected to the trailing edge box endwall. The air gap therefore may be vulnerable to dimensional variation, structural deflection, thermal growth and vibration of the augmentor components during engine operation. As a result, the air gap may become uneven around the circumference of the spray bar tip, which may cause non-uniform and unpredictable air swirl currents proximate the spray bar tip. There is a need in the art therefore for an augmentor configuration that provides substantially uniform and predictable air swirl currents around a spray bar tip.

SUMMARY OF THE DISCLOSURE

According to an aspect of the invention, an augmentor is provided for a gas turbine engine that includes an augmentor spray bar with a spray bar outlet, and an augmentor spray bar tip. The spray bar tip includes a tip body, a tip bushing and a tip support strut. The tip body includes a first flow passage extending therethrough between a tip inlet and a tip outlet, wherein the tip inlet is connected to the spray bar outlet. The tip bushing includes a bushing bore. The tip body extends through the bushing bore defining a second flow passage between the tip body and the tip bushing. The tip support strut connects the tip body to the tip bushing across the second flow passage.

The foregoing features and the operation of the invention will become more apparent in light of the following description and the accompanying drawings.

DETAILED DESCRIPTION OF THE INVENTION

Figure 1:
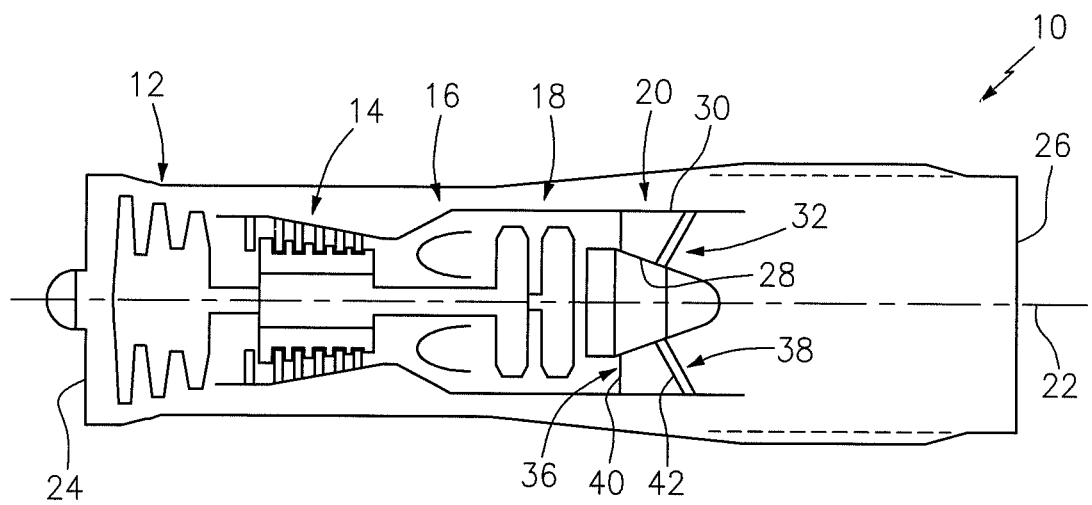
FIG. 1 is a cross-sectional illustration of a gas turbine engine.

FIG. 1 is a cross-sectional illustration of a gas turbine engine 10. The engine 10 includes a fan 12, a compressor 14, a combustor 16, a turbine 18, and an augmentor 20 sequentially arranged along an engine axis 22 between a forward engine airflow inlet 24, and an aft engine airflow exhaust 26.

Figure 2:
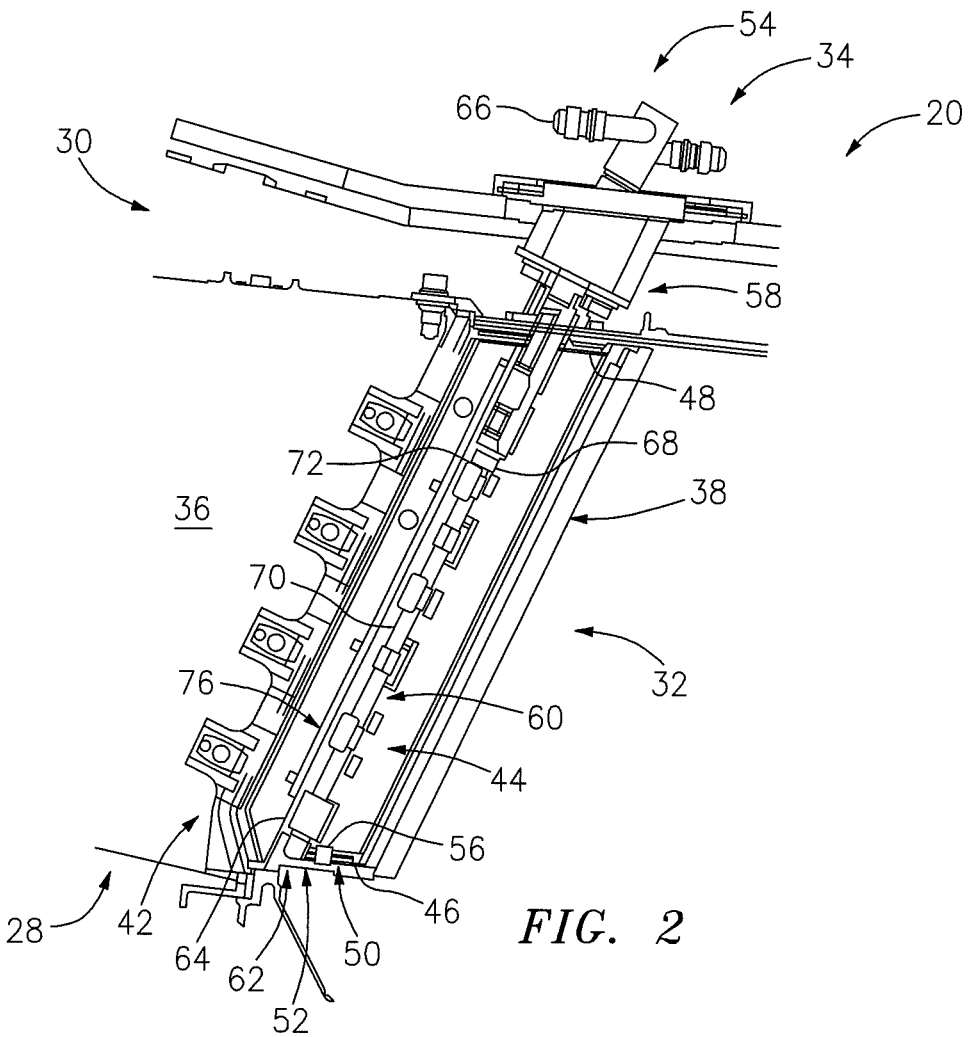
FIG. 2 is a cross-sectional illustration of a portion of an augmentor.

FIG. 2 is a cross-sectional illustration of a portion of the augmentor 20. The augmentor 20 includes an annular inner duct case 28, an annular outer duct case 30, one or more vanes 32, and an augmentor fuel delivery system 34. Each vane 32 extends radially from the inner duct case 28 to the outer duct case 30, and includes a vane airfoil 36 (see also FIG. 1) and a trailing edge box 38. The vane airfoil 36 extends between an airfoil leading edge 40 (see FIG. 1) and an airfoil trailing edge 42. The trailing edge box 38 is connected to the airfoil trailing edge 42. The trailing edge box 38 includes an inner box cavity 44 that extends radially between a radial inner endwall 46 and a radial outer endwall 48. The inner endwall 46 of at least one of the trailing edge boxes 38 includes an igniter aperture 50 located adjacent to a tip aperture 52 (see also FIG. 3).

Figure 4:
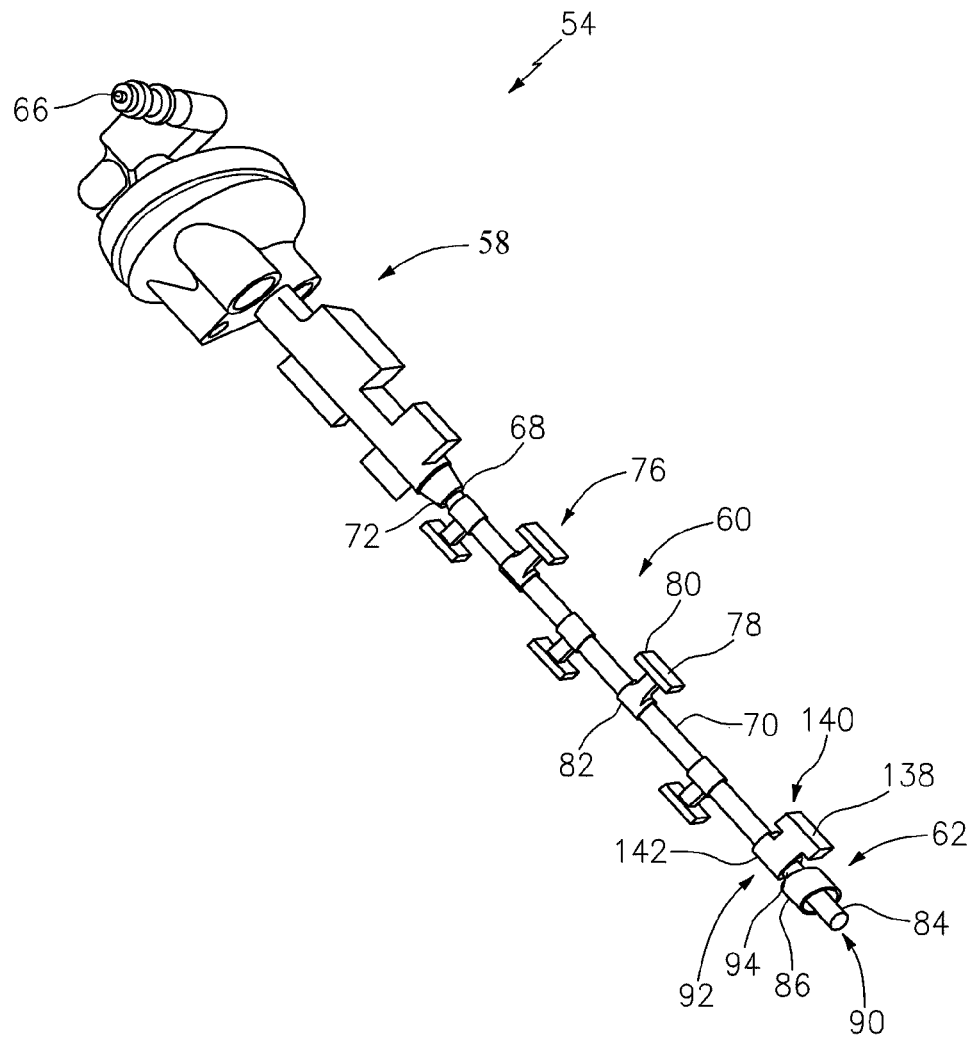
FIG. 4 is a perspective illustration of an augmentor fuel delivery device.

The fuel delivery system 34 includes one or more augmentor fuel delivery devices 54 and at least one igniter 56. Each fuel delivery device 54 includes an augmentor base 58 and an augmentor spray bar 60. At least one of the fuel delivery devices 54 also includes an augmentor spray bar tip 62 and an endwall mating sleeve 64. FIG. 4 is a perspective illustration of such a fuel delivery device that includes a spray bar tip.

Referring to FIGS. 2 and 4, the base 58 extends between a fuel inlet 66 and a fuel outlet 68.

Figure 5:
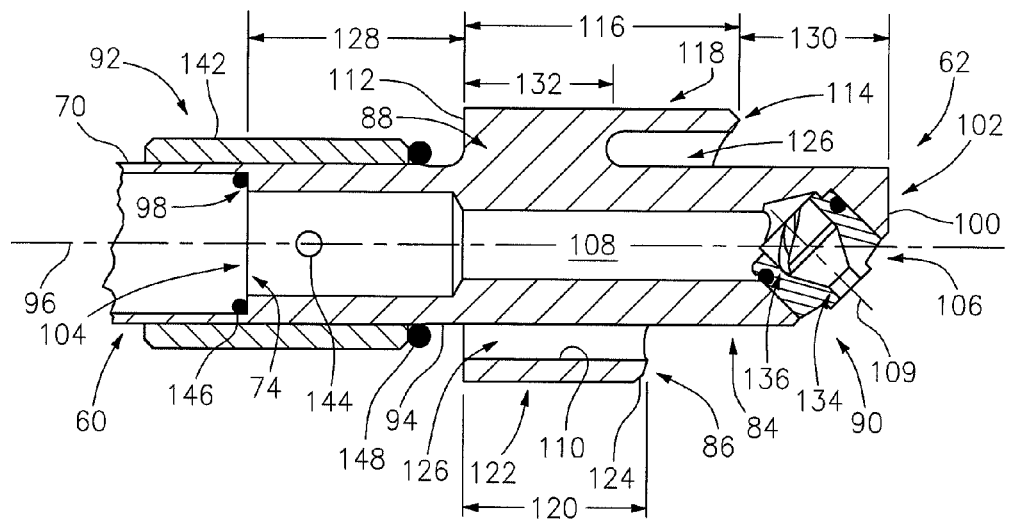
FIG. 5 is a cross-sectional illustration of a spray bar tip included in the fuel delivery device illustrated in FIG. 4.

The spray bar 60 includes a tubular spray bar sidewall 70 that extends between a spray bar inlet 72 and a spray bar outlet 74 (see FIG. 5). The spray bar 60 may include one or more spray bar nozzle assemblies 76. Referring to FIG. 4, each spray bar nozzle assembly 76 includes a spray bar nozzle 78, a lug 80 and a support sleeve 82. The spray bar nozzle 78 is configured (e.g., embedded) into the lug 80. The spray bar nozzle 78 is connected to an aperture (not shown) that extends through the spray bar sidewall 70 and the support sleeve 82. The lug 80 extends radially from the support sleeve 82, which wraps around the spray bar sidewall 70 connecting the lug 80 to the spray bar 60. An example of an alternative spray bar configuration is disclosed in U.S. Pat. Nos. 7,647,775 and 7,578,131, each of which is hereby incorporated by reference in its entirety, and is assigned to the assignee of the present invention.

FIG. 5 is a cross-sectional illustration of the spray bar tip 62. Referring to FIGS. 4 and 5, the spray bar tip 62 includes a tip body 84, a tip bushing 86, one or more tip support struts 88, and a tip nozzle assembly 90. The spray bar tip 62 may also include a spray bar nozzle assembly 92.

Referring to FIG. 5, the tip body 84 includes a tubular tip body sidewall 94 that extends along a first axis 96 from a first tip body end 98 to a tip body endwall 100 at a second tip body end 102. The tip body 84 also includes a tip inlet 104, a tip outlet 106 and a first flow passage 108. The tip inlet 104 is disposed at the first tip body end 98. The tip outlet 106 is disposed at the second tip body end 102. The tip outlet 106 extends diagonally along a second axis 109 through a corner between the tip body sidewall 94 and the tip body endwall 100, where the second axis 109 is acute relative to the first axis 96. Alternatively, the tip outlet 106 may be configured such that the second axis 109 is parallel, perpendicular or obtuse relative to the first axis 96. The first flow passage 108 extends through the tip body 84 along the first axis 96 between the tip inlet 104 and the tip outlet 106.

The tip bushing 86 includes a bushing bore 110 (see also FIG. 3) that extends along the first axis 96 from a first bushing end 112 to a second bushing end 114. The second bushing end 114 may be scarfed such that a first axial bushing length 116 of a first bushing side 118 (e.g., the longest side of the bushing) is greater than a second axial bushing length 120 of a second bushing side 122 (e.g., the shortest side of the bushing), where the second bushing side 122 is located opposite (e.g., diametrically opposite) the first bushing side 118. The second bushing end 114 may include an outer radial beveled corner 124.

The tip body 84 extends through the bushing bore 110 defining a second flow passage 126 (see also FIG. 3) between the tip body 84 and the tip bushing 86. The first tip body end 98 is located a first axial distance 128 from the first bushing end 112. The second tip body end 102 is located a second axial distance 130 from the second bushing end 114 at the first bushing side 118. The second axis 109 may be circumferentially aligned with the second bushing side 122 (see also FIG. 3).

Figure 3:
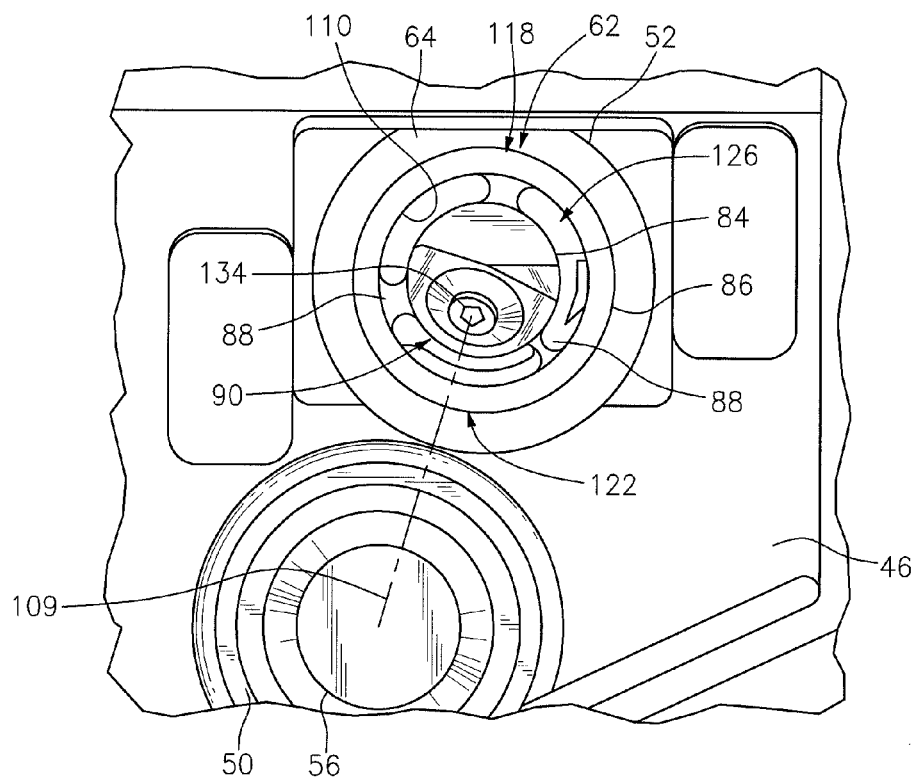
FIG. 3 is a perspective illustration of an inner endwall of a trailing edge box.

The tip support struts 88 connect the tip body 84 to the tip bushing 86 across the second flow passage 126, and each tip support strut 88 extends an axial strut length 132 from the first bushing end 112 towards the second bushing end 114. Each tip support strut 88 may be configured to reduce fluid drag therearound and/or guide fluid through the second flow passage 126 along a certain trajectory. Referring now to FIG. 3, the tip support struts 88 may be uniformly circumferentially spaced around the tip body 84. It is contemplated that the struts may be non-uniformly spaced around the tip body. The second axis 109 may be circumferentially aligned (e.g., centered) between two adjacent tip support struts 88.

Referring again to FIG. 5, the tip nozzle assembly 90 is connected to (e.g., seated within) the tip outlet 106. The tip nozzle assembly 90 may include a tip nozzle 134 and a tip swirler 136, and the tip swirler 136 may be arranged between the first flow passage 108 and the tip nozzle 134. An example of an alternative tip nozzle assembly is disclosed in U.S. Pat. No. 7,475,546, which is hereby incorporated by reference in its entirety, and is assigned to the assignee of the present invention.

Referring to FIG. 4, the spray bar nozzle assembly 92 includes a spray bar nozzle 138, a lug 140 and a support sleeve 142. The spray bar nozzle 138 is configured (e.g., embedded) into the lug 140, which extends radially from the support sleeve 142. The spray bar nozzle 138 is connected to an aperture 144 (see FIG. 5) that extends through the tip body sidewall 94 and the support sleeve 142.

The fuel outlet 68 is connected to the spray bar inlet 72.

Referring to FIG. 5, the tip inlet 104 is connected (e.g., braised at point 146) to the spray bar outlet 74. The support sleeve 142 wraps around an intersection between the tip body 84 and the spray bar 60, and is connected (e.g., braised at point 148) to the tip body 84.

Referring now to FIG. 2, the base 58 is mounted to the outer duct case 30. The spray bar 60 is arranged within the inner box cavity 44. The spray bar tip 62 extends from the inner box cavity 44 through the tip aperture 52. Referring to FIGS. 2 and 3, the mating sleeve 64 is configured between the tip aperture 52 and the tip bushing 86. The mating sleeve 64 may be fixedly connected to the inner endwall 46, and slideably connected to the tip bushing 86.

The igniter 56 is mounted to the inner endwall 46 within the igniter aperture 50 adjacent the spray bar tip 62. The second axis 109 is circumferentially aligned with the igniter 56.

During operation, a first fluid (e.g., fuel) is directed through the base 58 and the spray bar 60, and into the spray bar tip 62.

Referring to FIG. 5, the first flow passage 108 directs the first fluid through the spray bar tip 62 and into the tip nozzle assembly 90. Referring to FIGS. 3 and 5, the tip nozzle 134 ejects the first fluid out of the spray bar tip 62 along a trajectory (e.g., along the second axis 109) that is circumferentially aligned (e.g., centered) between the adjacent tip support struts 88. A second fluid (e.g., air) is directed out of the inner box cavity 44 (see FIG. 2) through the second flow passage 126. The first and the second fluids may mix in a substantially uniform manner because (i) the tip support struts 88 maintain a substantially uniform air gap around the tip body 84 during typical engine operation, and (ii) the trajectory of the ejected first fluid substantially symmetrically bisects air currents produced by the second fluid exiting the second flow passage 126. The mixed fluids may subsequently be ignited by the igniter 56 (see FIG. 3) in order to light the augmentor 20 to provide additional engine thrust.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. An augmentor for a gas turbine engine, comprising:
   an augmentor spray bar comprising a spray bar outlet and a spray bar nozzle; and
   an augmentor spray bar tip comprising
      a tip body comprising a first flow passage extending therethrough between a tip inlet and a tip outlet, wherein the tip inlet is connected to the spray bar outlet;
      a tip bushing comprising a bushing bore, wherein the tip body extends through the bushing bore defining a second flow passage between the tip body and the tip bushing; and
      a tip support strut connecting the tip body to the tip bushing across the second flow passage.

2. The augmentor of claim 1, wherein the tip support strut is one of a plurality of tip support struts connecting the tip body to the tip bushing.

3. The augmentor of claim 2, wherein the spray bar tip further comprises a nozzle connected to the tip outlet, and the nozzle ejects fuel out of the spray bar tip along a trajectory that is circumferentially aligned between two adjacent tip support struts.

4. The augmentor of claim 3, wherein the trajectory is circumferentially centered between the two adjacent tip support struts.

5. An augmentor for a gas turbine engine, comprising:
   an augmentor spray bar comprising a spray bar outlet; and
   an augmentor spray bar tip comprising
      a tip body comprising a first flow passage extending therethrough between a tip inlet and a tip outlet, wherein the tip inlet is connected to the spray bar outlet;
      a tip bushing comprising a bushing bore, wherein the tip body extends through the bushing bore defining a second flow passage between the tip body and the tip bushing; and
      a tip support strut connecting the tip body to the tip bushing across the second flow passage;

wherein the tip support strut is one of a plurality of tip support struts connecting the tip body to the tip bushing; and wherein the tip body comprises a tubular sidewall connected to an endwall, and the tip outlet extends diagonally through a corner between the sidewall and the endwall along an axis that is circumferentially aligned between two adjacent tip support struts.

6. The augmentor of claim 2, wherein the tip support struts are uniformly spaced circumferentially around the tip body.

7. The augmentor of claim 1, wherein the tip bushing extends to a scarfed bushing end, and an outlet of the second flow passage is defined between the scarfed bushing end and the tip body.

8. The augmentor of claim 1, wherein the tip bushing extends to a bushing end comprising an outer radial beveled corner.

9. The augmentor of claim 1, wherein the spray bar tip further comprises a nozzle and a swirler that are connected to the tip outlet.

10. The augmentor of claim 1, wherein the spray bar tip further comprises a spray bar nozzle assembly mounted around an intersection between the spray bar and the tip body.

11. An augmentor for a gas turbine engine, comprising:
an augmentor spray bar comprising a spray bar outlet;
an augmentor spray bar tip comprising
    a tip body comprising a first flow passage extending therethrough between a tip inlet and a tip outlet, wherein the tip inlet is connected to the spray bar outlet;
    a tip bushing comprising a bushing bore, wherein the tip body extends through the bushing bore defining a second flow passage between the tip body and the tip bushing; and
    a tip support strut connecting the tip body to the tip bushing across the second flow passage; and
a trailing edge box comprising an endwall with a tip aperture, wherein the spray bar is arranged within the trailing edge box, and the tip bushing extends through the tip aperture.

12. The augmentor of claim 11, further comprising a mating sleeve connected to the endwall, and disposed between the tip aperture and the tip bushing.

13. The augmentor of claim 11, further comprising an igniter mounted to the endwall adjacent the spray bar tip.

14. The augmentor of claim 1, wherein the spray bar nozzle is one of a plurality of spray bar nozzles included in and arranged along the augmentor spray bar.

* * * * *